F. A. PREUSS.
WINDMILL.
APPLICATION FILED MAR. 11, 1908.

940,057.

Patented Nov. 16, 1909.
3 SHEETS—SHEET 1.

Witnesses

Inventor
Fredrich A. Preuss
By F. J. Larson & Co.
Attorneys

F. A. PREUSS.
WINDMILL.
APPLICATION FILED MAR. 11, 1908.

940,057.

Patented Nov. 16, 1909.
3 SHEETS—SHEET 3.

Witnesses
R. A. Boswell
John Powers

Inventor
Fredrich A. Preuss.
By F. J. Larson & Co.
Attorneys

UNITED STATES PATENT OFFICE.

FREDRICK A. PREUSS, OF GREEN GARDEN TOWNSHIP, MADISON COUNTY, NEBRASKA.

WINDMILL.

940,057.        Specification of Letters Patent.     Patented Nov. 16, 1909.

Application filed March 11, 1908. Serial No. 420,521.

*To all whom it may concern:*

Be it known that I, FREDRICK A. PREUSS, a citizen of the United States, residing in Green Garden township, in the county of Madison and State of Nebraska, have invented certain new and useful Improvements in Windmills, of which the following is a specification.

This invention relates to new and useful improvements in wind wheels and more particularly to improvements in means for automatically moving the vanes into or out of the wind to compensate for speed variations due to changes in the velocity of the wind and to maintain the rotation of the wind wheel at a uniform speed.

The invention comprises generally vanes mounted for partial rotation on the spokes of the wheels, means for operating the vanes in their movements, centrifugal actuating means forming a part of and coöperating with the operating means, and spring or equivalent means for holding the vanes normally at positions in the wind.

In connection with a wind wheel having the above general characteristics, the invention aims as a primary object to provide a novel construction, combination and arrangement of parts.

The details of construction will appear in the course of the following description in which reference is had to the accompanying drawings forming a part of this specification, like characters of reference designating similar parts throughout the several views wherein :—

Figure 1:
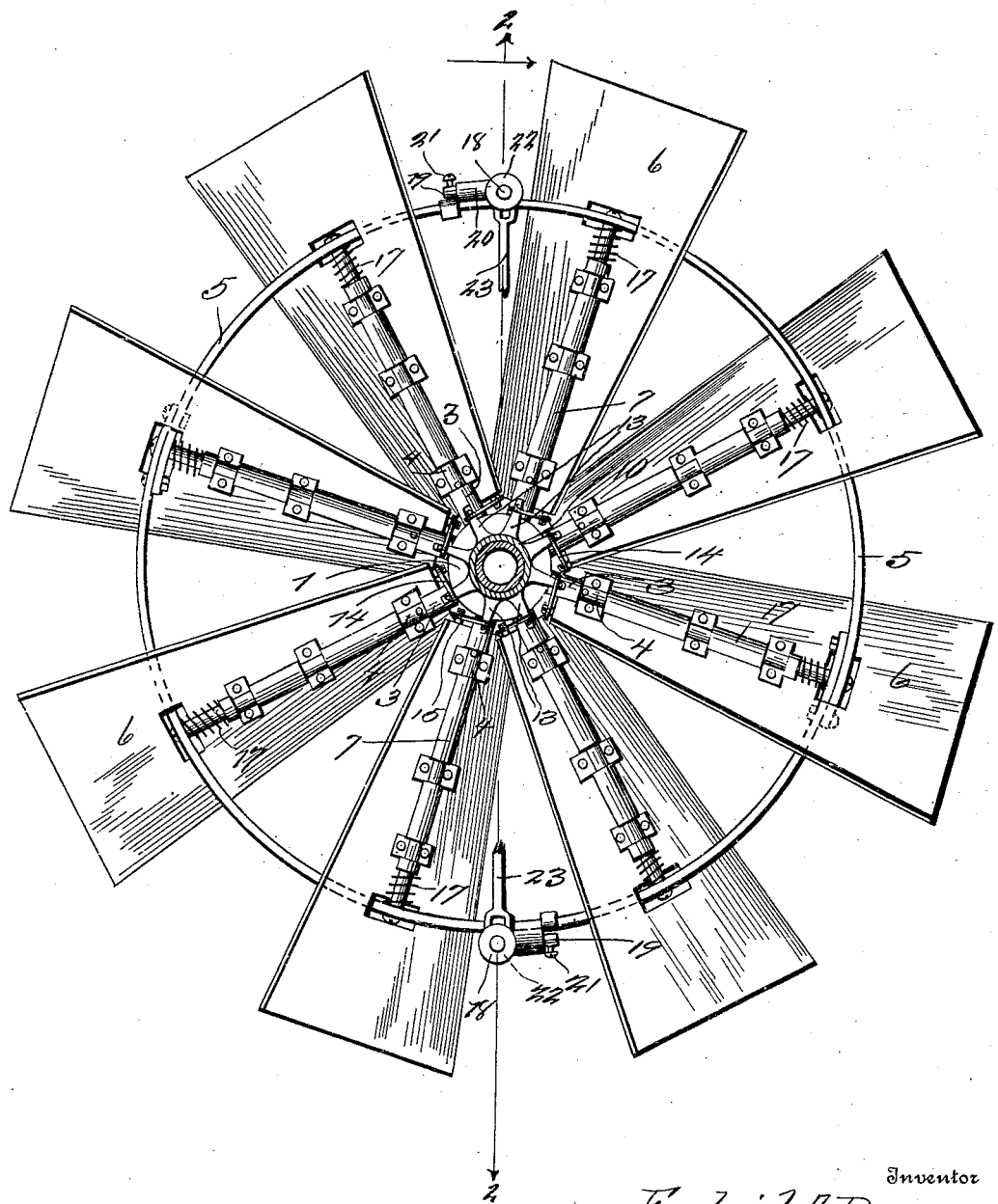
Figure 2:
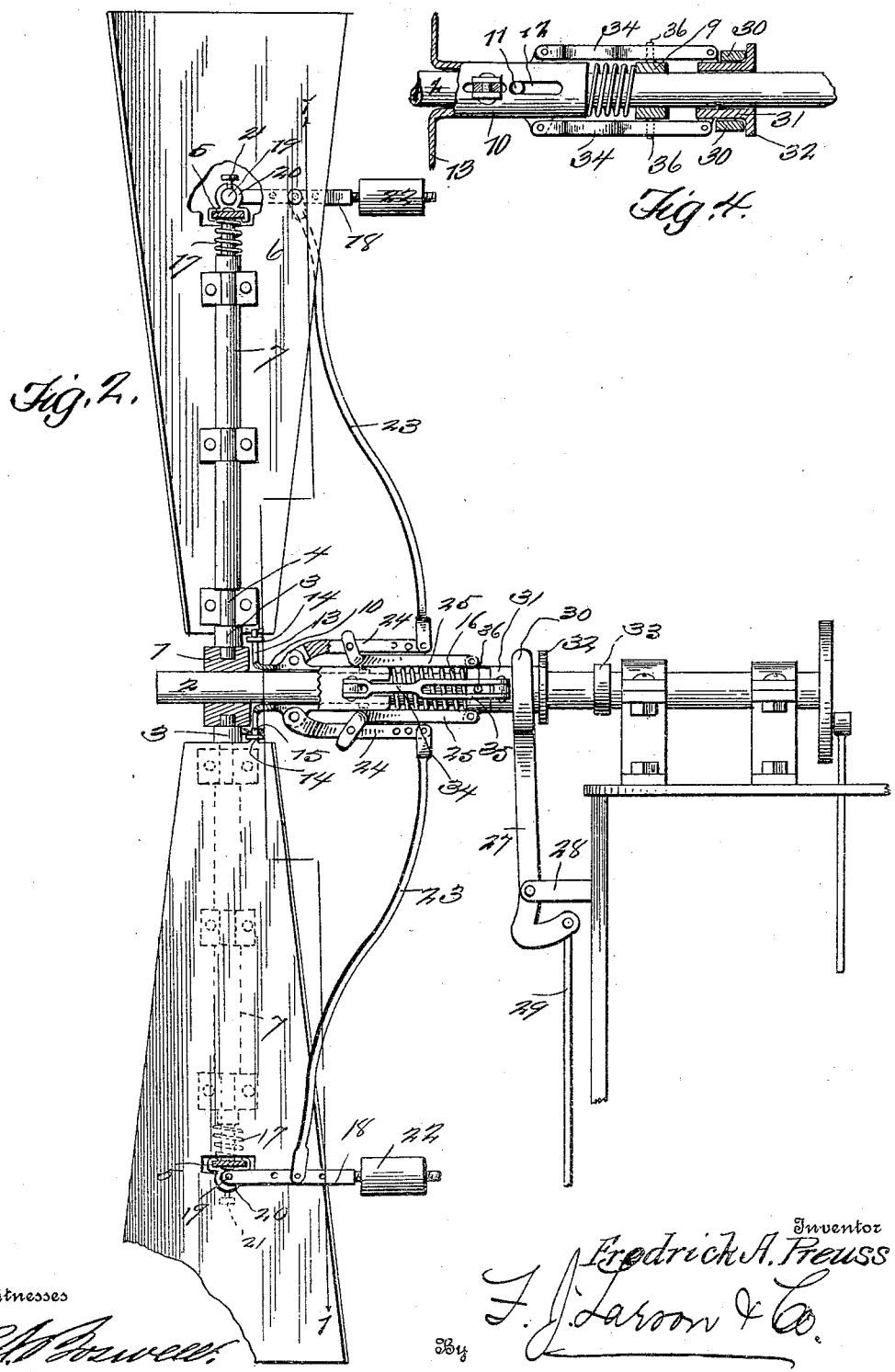
Figure 3:
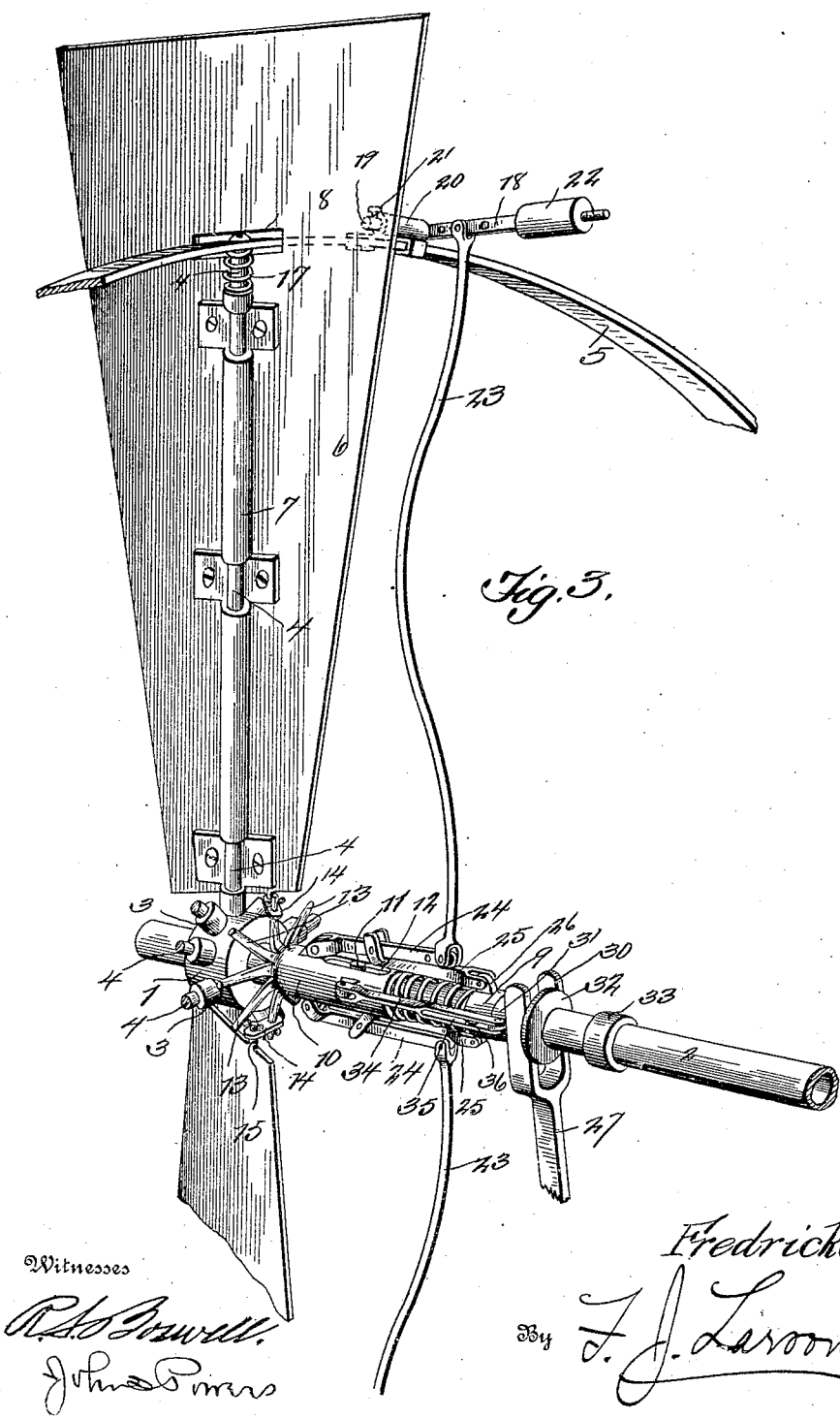

Figure 1 is a cross sectional view on the line 1—1 of Fig. 2, showing in side elevation the wind wheel as an entirety, Fig. 2 is a longitudinal sectional view on the line 2—2 of Fig. 1, looking in the direction of the arrow, the vanes being shown in perspective and other parts being shown in side elevation. Fig. 3 is a fragmentary perspective view of the wheel, the operating mechanism for the vanes and the centrifugal actuating mechanism. Fig. 4 is a detailed longitudinal sectional view of the operating mechanism taken in a plane at right angles to the plane of Fig. 2.

The wind wheel structure comprises a hub 1, mounted on the shaft 2, and provided with sockets 3, in which are seated the radial spokes 4, bolted to the ring 5. The vanes, designated 6 are mounted for partial rotation on the spokes 4 and toward this end carry bearing clips 7, which surround said spokes. Each vane 6 has, in the outer portion thereof a transverse slot 8 through which the ring 5 passes, the slots 8 being of sufficient width to allow of the partial rotation of the vanes.

The operating mechanism comprises essentially a collar 9, fast upon the shaft 2, and a sleeve 10, slidable upon said shaft between the hub 1 and said collar. Said shaft is formed with guide pins or lugs 11 which pass through longitudinal slots 12 in the sleeve 10. Said sleeve at its end adjacent the hub 1 terminates in a plurality of radially disposed arms 13, which are each connected by links 14 with inwardly projecting lugs 15 formed on the several correspondingly located vanes 6. Between the collar 9 and the sleeve 10 an expansive coil spring 16 is provided which acts to force said sleeve to the inward limit of its movement, in which position the vanes are held into the wind. For the purpose of augmenting the action of the spring 16, torsional springs 17 are employed which surround the spokes 4 and have their ends secured to said ring and to the outer ends of the clips 7. The springs 17 have the additional function of cushioning the vanes 6 in their movements so as to prevent a too sudden operation of the parts, which would tend to cause undue vibration and wear.

The centrifugal actuating mechanism comprises arms 18 having angular end portions 19 journaled in bearings 20 secured at opposite points on the ring 5, the portions 19 being held against displacement from said bearings by stop screws 21. Weights 22 are adjustably mounted on the threaded outer end portions of the arms 18. At points intermediate of said arms, the ends of links 23 are pivotally secured, which links have their other ends pivoted to respective levers 24, the latter being pivoted to the sleeve 10. Links 25 are pivoted to the levers 24 between their ends and to lugs 26 on the collar 9. It will thus be seen that under a high wind, when the rotation of the wheel exceeds a predetermined limit, the arms 18 will move outwardly by centrifugal force, and in such outward movement will through the medium of the links 23, levers 24 and links 25, move the sleeve 10 toward the collar 9, such movement of the sleeve 10 moving the vanes 6 out of the wind thereby reducing the speed of the wheel. When the speed falls to the determinate degree, the arms 18 will move inwardly and the springs 16 and 17 will reset the parts to normal position, the vanes 6 being thus restored to positions against the wind.

In case it is desired to stop the action of the wheel or to reduce its speed to a minimum, manually controlled actuating means are provided. Such manual means comprises a bell crank lever 27 pivoted to a bracket 28 on the wind mill frame and having one arm connected to a pull rod 29 and its other arm terminating in a fork 30 which surrounds a sleeve 31 slidable on the shaft 2 and formed with an annular flange 32 against which the fork 30 bears. Movement of the sleeve 31 in one direction is limited by the collar 9 and in the opposite direction by a stop collar 33 provided on the shaft 2. The sleeve 31 is connected to the sleeve 10 by links 34 having slotted ends 35 to receive guide pins 36 provided on the collar 10. It will thus be seen that when the rod 29 is pulled manually, the lever 27 will move the sleeve 31, toward the collar 33 whereby the sleeve 10 will be moved toward the collar 9.

The invention may be altered in various detailed features without a departure from the basic principle involved and within the scope of the terms of the appended claims.

Having thus fully described my invention I claim:—

1. A windmill comprising, in combination, a shaft, a wind-wheel frame mounted thereon, said frame having a peripheral band and spokes, a series of vanes mounted on said frame slotted to receive said band and lie adjacent said spokes, horizontal casings rotatably securing said vanes to said spokes and permitting radial movement, a slidable member mounted on said shaft and having a star-wheel whose fingers are in engagement with said vanes to impart rotation thereto, a weighted lever secured to said peripheral band and projecting rearwardly over said shaft, and direct lever connections between said sliding member and said weighted levers, to automatically rotate said vanes.

2. In wind mills, in combination, a shaft, a wind wheel structure thereon including a frame having vanes mounted thereon for partial rotation, operating means comprising a collar fast on the shaft, a sleeve slidable on the shaft, connections between the sleeve and the vanes to move the latter pivotally when the former is moved slidably and an expansive coil spring between the collar and the sleeve, and actuating means comprising weighted arms pivoted on the wheel structure, levers pivoted on the sleeve, links pivoted to the levers and the collar and links connecting the arms and the levers.

3. In wind mills, in combination, a shaft, a wind wheel structure comprising a frame having partially rotatable vanes mounted thereon, operating means comprising a collar fast on the shaft, a sleeve slidable on the shaft, operative connections between the sleeve and the vanes and an expansive coil spring between the collar and the sleeve for holding the latter in a normal position, and actuating means comprising a lever pivoted to the sleeve, a link pivoted to the lever and to the collar and means for moving the lever on its pivot.

In testimony whereof I affix my signature, in presence of two witnesses.

FREDRICK A. PREUSS.

Witnesses:
CARL DEMMEL,
HERBERT BUETTNER.